Figure 1:
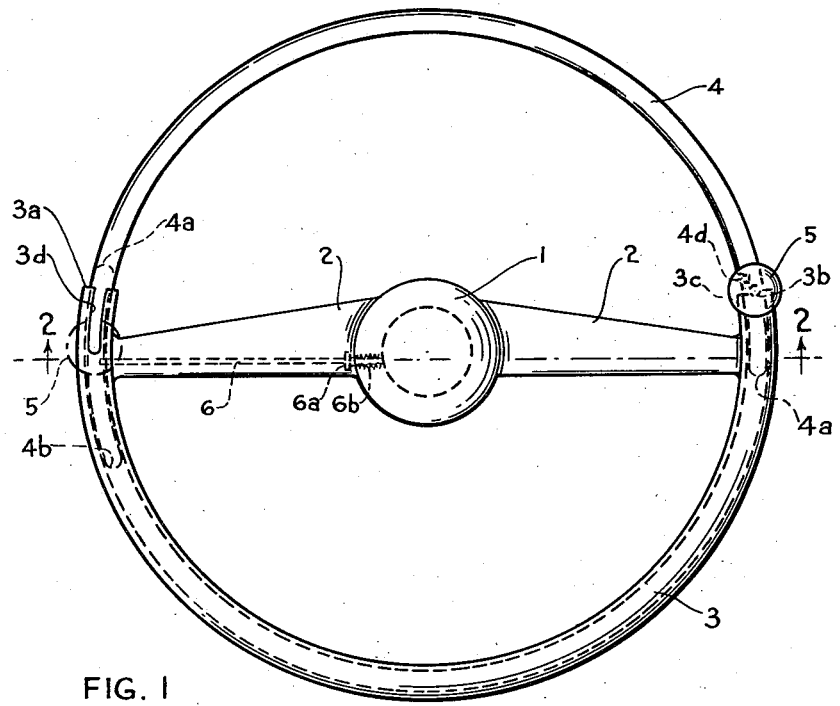

Jan. 7, 1958     S. BAYKO     2,818,749

AUTOMOBILE STEERING WHEEL

Filed Jan. 28, 1954

Inventor

STEVE BAYKO by W. Irwin Heskett
Attorney

United States Patent Office 2,818,749
Patented Jan. 7, 1958

2,818,749

AUTOMOBILE STEERING WHEEL

Steve Bayko, Penhold, Alberta, Canada

Application January 28, 1954, Serial No. 406,667

3 Claims. (Cl. 74—552)

This invention relates to improvements in an automobile steering wheel and appertains particularly to one that is collapsible whereby the upper part of the wheel rim may be displaced and a driver of short stature that has difficulty seeing over the rim or through the wheel may be afforded an unobstructed view.

An object of the invention is to provide a steering wheel that may be easily and quickly collapsed to a half wheel or extended to the usual full circle.

A further object of the invention is the provision of a collapsible steering wheel of the nature and for the purpose described that is characterized by structural neatness, compactness and simplicity and capable of manufacture at a reasonable price whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 2:
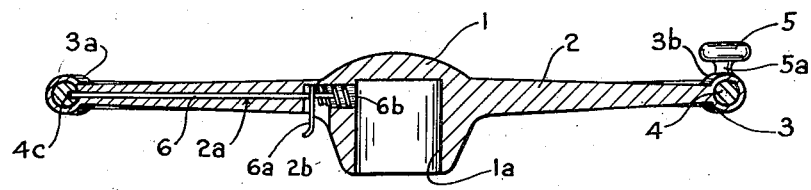

In the drawings:

Figure 1 is an elevation of a circumferentially telescoping steering wheel constructed in accordance with this invention; and Figure 2 is a transverse section thereof, as taken on line 2—2 looking in the direction indicated by the arrows.

Automobile drivers of short stature have often experienced difficulty in viewing the road ahead because of the upper part of the steering wheel rim falling in the line of vision and obstructing an important part of the view. For such, the optional temporary removal of the view-obstructing part of the steering wheel is not merely a matter of convenience but an urgent one of safety. Others may wish to collapse the wheel simply through a preference for the aeroplane-type half wheel.

To attain such an end, the upper half of the wheel could be removable from or laterally hingeable on the lower half but readily recognizable disadvantages will be found in either solution. I prefer that the wheel be constructed with a hub mountable in the usual way on the steering column of the vehicle and the rim constructed in circumferentially telescoping halves, the lower of which alone connects with the hub and is in the form of an arcuate hollow tube for the reception of the slidable upper half.

In the preferred embodiment of the invention shown, the steering wheel hub 1 has the usual concentric steering post-receiving socket 1a on its under side and from opposite sides of this hub a pair of radial spokes 2 extend, whose outer ends unite with the integral arcuate rim part 3 that forms the lower part of the steering wheel rim and is a substantially semi-circular tube open at both ends 3a and 3b that terminate a short distance above or beyond the junction of the spokes 2 therewith. The upper rim part 4 is an arcuate or semi-circular member, preferably round in cross section and of a diameter to fit snugly in the hollow tube part 3 and to slide smoothly circumferentially therein. Naturally the sum of the arcs of the two parts 3 and 4 must total more than a full circle but I desire to extend the lower section about 10–15 degrees at each end above the horizontal median and to construct the upper section 4 also through an arc totalling approximately about 210 degrees and with semipherical ends 4a and 4b that, when the wheel is fully collapsed, just nose out of the opposite open ends 3a—3b of the fixed lower section 3.

Limiting the telescopic movement of the slidable rim section 4 in both directions is a wheel spinner knob 5 connecting to the section 4 by a stem 5a; in fully extended, complete wheel position the stem 5a seals in a semi-circular notch 3c on the edge of the open end 3b of the fixed rim section 3 and in collapsed, half-wheel position it runs down to the bottom of a deep slot 3d of the end 3a, in which latter position the ends 4a—4b of the collapsible section 4 just nose out of the ends 3a—3b of the fixed wheel rim part.

Whether the wheel rim be complete or collapsed, the telescoping upper rim section 4 is suitably locked against unauthorized circumferential movement relative to the fixed lower rim section 3. An acceptable locking device is here shown consisting of a longitudinally movable rod 6 slidable radially through a bore 2a in one of the spokes 2 with its outer end projecting through the tubular wall of the fixed lower rim section 3 to seat as a bolt in a pocket 4c in the upper sliding rim section 4 near its end 4b. A second bolt-receiving seat 4d near the opposite end 4a and just inside the point of connection of the spinner 5 accommodates the end of rod 6 when the wheel is in collapsed position, such second seat 4d being in registry with the bolt when the spinner stem 5a strikes the bottom of the slot 3d. A finger piece or lever 6a projects downwards below the spoke 2 from the rod 6 near its inner end through an opening 2b in the underside of the spoke and a coil spring 6b, encircling the inner end of the said rod and compressed between the lever 6a and the steering post inserted in the hub or other suitable stop at its inner end, serves to urge the rod 6 outwardly into engagement with the slidable wheel rim part 4.

In operation, if the wheel is in complete circle form and a half wheel is desired, the bolt 6 is withdrawn from the seat 4c by actuating the lever 6a against the pressure of the spring 6b and by gripping the spinner 5 the upper section 4 of the wheel rim is telescoped within the tubular lower section 3 until the spinner stem strikes the bottom of the notch 3d when the bolt 6 again shoots into locking position in the seat 4d. To return the wheel to complete circle form, the latch lever 6a is similarly retracted and the collapsible section 4 extended by means of the spinner knob until it strikes the end 3b when the spring urged bolt reseats in its first locking position. Thus, it will be seen that in either position the wheel rim parts are securely held together and also that the spinner knob may be used in the usual way irrespective of the relative position of the collapsible section on which it is mounted.

From the foregoing description taken in connection with the accompanying drawings, it will be manifest that an automobile steering wheel is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention what is claimed as new is:

1. An automobile steering wheel comprising a hub for mounting on the automobile steering column; a pair of spokes radiating therefrom; a wheel rim supported by said spokes and consisting of two telescopically related segments, one of which is integral with said spokes and in the form of a hollow arcuate tube and the other is an arcuate rod receivable therein and circumferentially projectable from one end of said arcuate tube to complete the circle of said rim; and a spinner knob mounted on the arcuate rod segment of said wheel rim, near an end thereof, and selectable engageable with opposite ends of the hollow arcuate tube segment to limit the telescopic sliding movement of said rod segment in both directions.

2. The combination with the structure set forth in claim 1, of a retractable bolt, radially slidable in one of said spokes, with an end projecting through the hollow arcuate tube segment and engaging the rod segment; said rod segment having a bolt-accommodating pocket near each end and so located that one such pocket is in registry with said bolt when said slide-limiting spinner knob engages either end of the hollow tube segment, thereby assuring that the circumferentially slidable, telescoping rod segment of said rim is locked in either fully extended or fully retracted position.

3. A steering wheel in accordance with the structure set forth in claim 1, wherein the hollow tube segment extends through an arc of approximately 200 degrees and the telescoping rod segment extends through an arc of approximately 210 degrees, so that together they total substantially more than a full circle thereby assuring adequate overlap at the ends when the rod segment is extended, and when said rod segment is in fully retracted position, the opposite ends thereof both just nose out the opposite ends of said hollow tube segment.

References Cited in the file of this patent

UNITED STATES PATENTS

| 1,125,539 | Horowitz | Jan. 19, 1915 |
| 1,149,029 | Clark | Aug. 3, 1915 |

FOREIGN PATENTS

| 792,324 | France | Dec. 28, 1935 |